(12) United States Patent
Field et al.

(10) Patent No.: US 8,782,795 B1
(45) Date of Patent: Jul. 15, 2014

(54) SECURE TENANT ASSESSMENT OF INFORMATION TECHNOLOGY INFRASTRUCTURE

(75) Inventors: John P. Field, Chatham, NJ (US); Thomas R. Maguire, Brewster, NY (US)

(73) Assignee: EMC Corporation, Hopkinton, MA (US)

( * ) Notice: Subject to any disclaimer, the term of this patent is extended or adjusted under 35 U.S.C. 154(b) by 133 days.

(21) Appl. No.: 13/436,020

(22) Filed: Mar. 30, 2012

(51) Int. Cl.
*H04L 29/06* (2006.01)

(52) U.S. Cl.
USPC ............................................................ 726/25

(58) Field of Classification Search
None
See application file for complete search history.

(56) References Cited

U.S. PATENT DOCUMENTS

| | | | |
|---|---|---|---|
| 2005/0044418 A1* | 2/2005 | Miliefsky | 713/201 |
| 2010/0100930 A1* | 4/2010 | King | 726/1 |
| 2011/0247047 A1* | 10/2011 | Loureiro et al. | 726/1 |
| 2012/0072716 A1* | 3/2012 | Hu et al. | 713/156 |
| 2012/0179646 A1* | 7/2012 | Hinton et al. | 707/607 |
| 2012/0185913 A1* | 7/2012 | Martinez et al. | 726/1 |

* cited by examiner

Primary Examiner — David Pearson
(74) Attorney, Agent, or Firm — Ryan, Mason & Lewis, LLP

(57) ABSTRACT

Information technology infrastructure comprises a computing environment shared by multiple tenants of a service provider, and a secure assessment environment separate from the shared computing environment. An evidence collection module associated with the shared computing environment collects compliance evidence from the shared computing environment for storage in the secure assessment environment. A tenant assessment interface to the secure assessment environment is provided, through which the tenants can access the compliance evidence as stored in the secure assessment environment in a manner that does not undermine security of the shared computing environment. The compliance evidence may include, for example, information sufficient to allow a tenant to verify that the shared computing environment is configured in accordance with a specified security policy. In an illustrative embodiment, the information technology infrastructure comprises cloud infrastructure of a cloud service provider and the shared computing environment comprises a cloud computing environment.

31 Claims, 5 Drawing Sheets

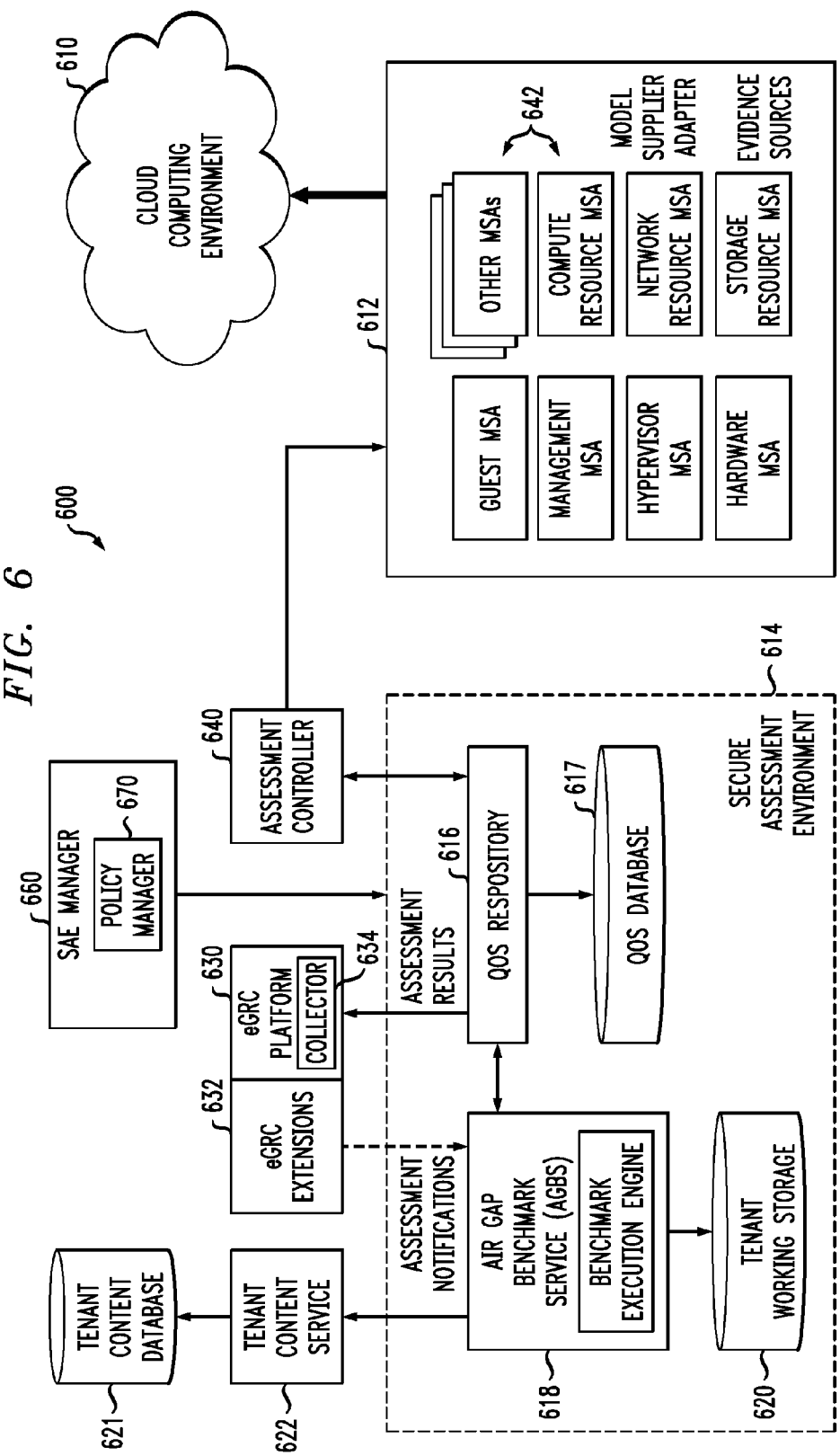

SECURE TENANT ASSESSMENT OF INFORMATION TECHNOLOGY INFRASTRUCTURE

FIELD

The field relates generally to information processing systems, and more particularly to cloud-based information processing systems and other types of information processing systems that implement computing environments shared by multiple tenants.

BACKGROUND

An increasing number of companies and other enterprises are reducing their costs by migrating portions of their information technology infrastructure to cloud service providers. For example, virtual data centers and other types of systems comprising distributed virtual infrastructure are coming into widespread use. Commercially available virtualization software such as VMware® vSphere™ may be used by cloud service providers to build a variety of different types of virtual infrastructure, including private and public cloud computing and storage systems, which may be distributed across hundreds of interconnected computers, storage devices and other physical machines. Typical cloud service offerings include, for example, Infrastructure-as-a-Service (IaaS), Platform-as-a-Service (PaaS), and Software-as-a-Service (SaaS).

In cloud-based information processing system arrangements of the type described above, enterprises in effect become tenants of the cloud service providers. However, by relinquishing control over their information technology resources, these cloud tenants expose themselves to additional potential security threats. As one illustration, a given tenant may be inadvertently sharing physical hardware resources of a cloud computing environment with other tenants that could be competitors or attackers. Similar issues arise in other types of information processing systems in which computing environments are shared by multiple tenants.

It is therefore important for the tenants to be able to verify that the service provider is complying with appropriate security policies. For example, the tenants would generally like to be able to verify that cloud infrastructure has been configured securely, i.e. that it has been appropriately "hardened" against intrusion or unauthorized usage. This may include verifying that desired or required technical security controls and specific system configuration settings are present and operating.

The typical conventional approach to performing security hardening assessments on information technology infrastructure requires that the relying party be provided with direct, privileged access to all of the relevant hardware and software resources. This presents a number of practical challenges that make it infeasible in a cloud computing environment, where any one tenant is usually utilizing a small, arbitrary subset of the complete computing resources that are operated by the service provider. For security reasons, it would be highly unlikely for a tenant to be given the required level of direct, privileged access needed to test or otherwise assess the entire cloud computing infrastructure. Granting this level of direct, privileged access to any one tenant would not only pose a security risk to the other tenants, it would also violate the security of the service provider.

SUMMARY

Illustrative embodiments of the present invention provide techniques for permitting tenants to test or otherwise assess compliance status of a shared computing environment in a secure manner. In arrangements of this type, the shared computing environment may be advantageously isolated from a separate tenant assessment environment by an "air gap" that protects both the tenants and the service provider while still providing accurate compliance assessment results.

In one embodiment, information technology infrastructure comprises a computing environment shared by multiple tenants of a service provider, and a secure assessment environment that is separate from the computing environment. An evidence collection module associated with the shared computing environment collects compliance evidence from the shared computing environment for storage in the secure assessment environment. A tenant assessment interface to the secure assessment environment is provided, through which the tenants can access the compliance evidence stored in the secure assessment environment in a manner that does not undermine security of the shared computing environment.

The secure assessment environment may be configured to maintain relationships between controls assessable by the tenants, sources of evidence relating to those controls, and corresponding service state information models. In addition, the secure assessment environment may adapt one or more of the relationships at run time in response to one or more tenant assessment requests.

The compliance evidence may comprise, for example, information sufficient to allow a tenant to verify that the shared computing environment is configured in accordance with a specified security policy. The compliance evidence in one or more of the illustrative embodiments provides a representation of the shared computing environment that is sufficient to allow performance of one or more benchmarking tests on that representation in the secure assessment environment. Portions of the collected compliance evidence may be stored in the secure assessment environment in an encapsulated form, for example, utilizing respective XML envelopes each incorporating provenance metadata identifying a source of the corresponding portion of the collected compliance evidence.

The tenant assessment interface may be configured to receive assessment requests from the tenants and to provide in response to a given such assessment request a corresponding assessment result that is determined by performing at least one assessment operation utilizing at least a portion of the stored compliance evidence. The assessment operations may comprise, for example, benchmarking tests specified at least in part by the requesting tenant, and may more particularly be specified at least in part utilizing languages such as, for example, Open Vulnerability and Assessment Language (OVAL) and Extensible Configuration Checklist Description Format (XCCDF).

By way of example, the information technology infrastructure may comprise cloud infrastructure of a cloud service provider and the shared computing environment may comprise a cloud computing environment. Numerous other types of information technology infrastructure may be configured for secure tenant assessment using the disclosed techniques.

One or more of the illustrative embodiments described herein overcome the difficulties associated with conventional tenant verification of service provider compliance in a cloud computing environment or other shared computing environment. For example, by isolating a separate secure assessment environment from the shared computing environment and providing a tenant assessment interface to the secure assessment environment, tenants can verify that the shared computing environment complies with one or more advertised security policies without the need for unduly broad access privileges to the shared computing environment itself. This allows the establishment of a known level of trust in the service provider infrastructure, while maintaining appropriate security protections for the tenants as well as the service provider. Also, the disclosed arrangements can be configured to support a broad array of new types of compliance assessment that would not otherwise be possible under currently-accepted models, while also ensuring backward compatibility with existing tenant benchmarking tests.

BRIEF DESCRIPTION OF THE DRAWINGS

FIGS. 5 and 6 show more detailed views of respective exemplary implementations of the FIG. 1 system.

DETAILED DESCRIPTION

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
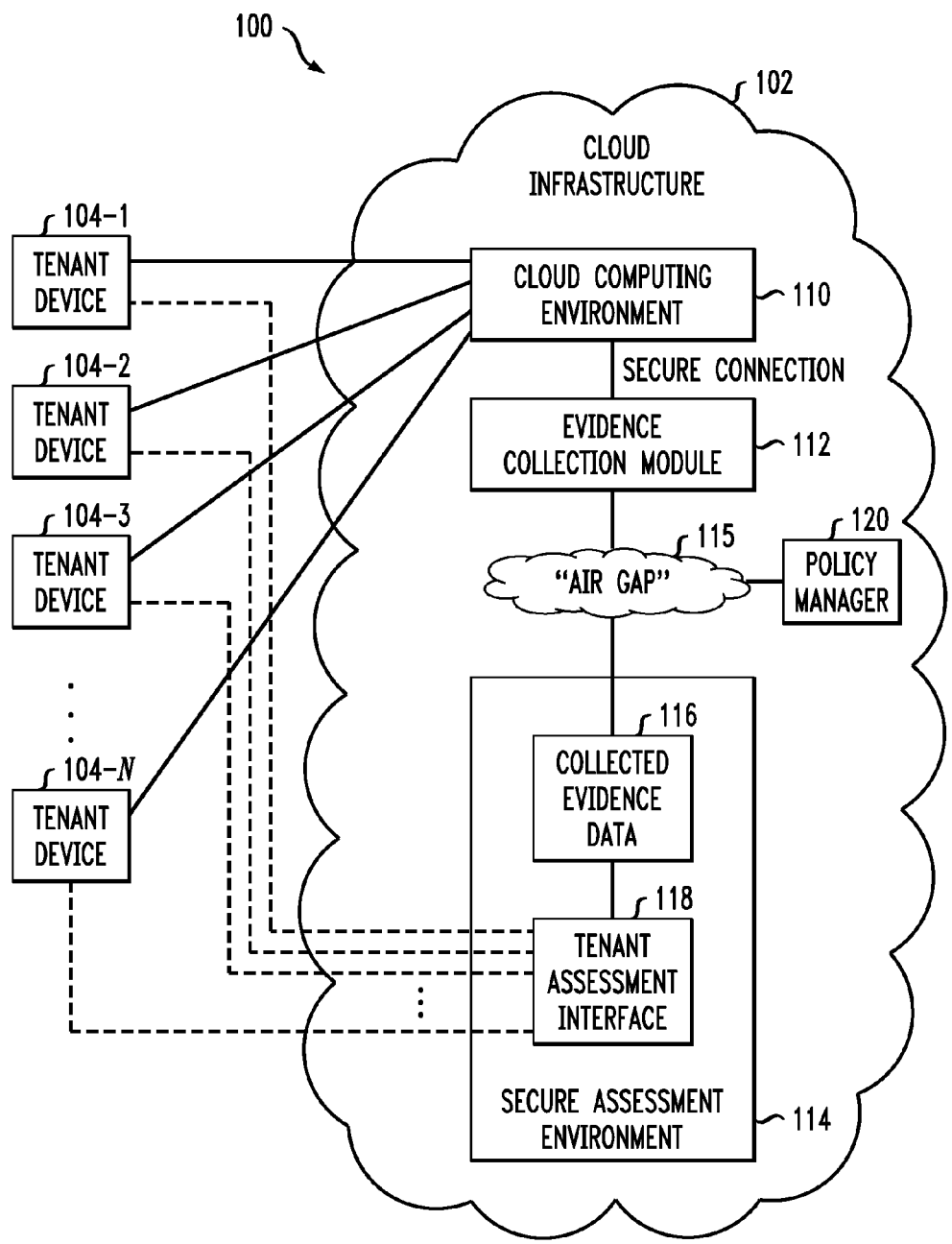
FIG. 1 is a block diagram of an information processing system implementing secure tenant assessment of a shared computing environment in an illustrative embodiment of the invention.

FIG. 1 shows an information processing system 100 configured in accordance with an illustrative embodiment of the present invention. The information processing system 100 comprises cloud infrastructure 102. Tenants associated with respective tenant devices 104-1, 104-2, . . . 104-N utilize services provided by the cloud infrastructure 102, and the tenant devices may be configured to access the cloud infrastructure via a network or other communication channel. The term "tenant" as used herein is intended to be broadly construed, and may be used to refer to a user or other entity, its associated device or both. The same reference numeral 104 will be used for all of these cases.

The cloud infrastructure 102 may comprise, for example, software products running on a processing platform of a cloud service provider, although other types of products, including hardware products or virtualized products, may additionally or alternatively be utilized by at least a subset of the tenants 104. The cloud infrastructure 102 may be viewed as comprising physical infrastructure and associated virtualization infrastructure running on the physical infrastructure.

In the present embodiment, the cloud infrastructure 102 comprises a cloud computing environment 110 shared by the tenant devices 104, an evidence collection module 112, and a secure assessment environment 114.

The evidence collection module 112 associated with the cloud computing environment 110 is configured to collect compliance evidence from the cloud computing environment and to make the collected compliance evidence available to the secure assessment environment 114 for storage therein. As illustrated in the figure, the secure assessment environment 114 comprises collected evidence data 116 and a tenant assessment interface 118.

The secure assessment environment 114 is separated from the computing environment 110 and evidence collection module 112 by an "air gap" 115 which may be configured, for example, to block any attempted unauthorized communications directed from the secure assessment environment 114 to the cloud computing environment 110 or to its associated evidence collection module 112. The air gap 115 therefore ensures that the tenant devices 104 accessing the secure assessment environment cannot utilize that assessment environment as an access point to the cloud computing environment 110 or its associated evidence collection module 112.

More particularly, the air gap 115 in the present embodiment can be implemented in the form of a network or application level firewall that prevents unauthorized communications, inbound, outbound, or both. In various embodiments, for example in a highly sensitive environment, such as in military and intelligence applications, it might also be an actual physical air gap, where the systems are not physically connected. In that case the data may be conveyed across the gap by connecting the systems only temporarily, or transporting physical media out of band, etc.

Although shown in the present embodiment as being separate from the cloud computing environment 110 and the secure assessment environment 114, portions of the evidence collection module 112 in other embodiments may be implemented at least in part within the cloud computing environment 110 or the secure assessment environment 114.

The position of the air gap 115 in FIG. 1 is only exemplary, and other types and arrangements of one or more air gaps may be used to separate secure assessment environment 114 from the associated cloud computing environment 110. In one such arrangement, the secure assessment environment itself may be configured to prevent any unauthorized communications between the tenant assessment interface 118 and the cloud computing environment 110.

The tenant assessment interface 118 of the secure assessment environment 114 is configured to allow the tenants to access at least a portion of the collected evidence data 116 as stored in the secure assessment environment, in a manner that does not undermine security of the cloud computing environment 110. The tenant assessment interface 118 therefore provides no tenant access to the cloud computing environment 110 in the present embodiment. The tenants 104 may access the tenant assessment interface 118 over one or more networks or other channels. These channels may be separate from those used by the tenants to access the cloud computing environment 110. Although multiple tenants have access to the tenant assessment interface 118 in the present embodiment, in other embodiments a separate instance of the tenant assessment interface may be provided for each of the tenants 104.

The collected evidence data 116 which the tenants 104 are permitted to access illustratively comprises compliance evidence sufficient to allow a given one of the tenants to verify that the cloud computing environment 110 is configured in accordance with a specified security policy of the service provider. By way of example, at least a portion of the collected compliance evidence may be stored in the secure assessment environment 114 in an encapsulated form utilizing an XML envelope that incorporates provenance metadata identifying a source of the portion of the collected compliance evidence. Such collected compliance evidence generally provides a representation of the cloud computing environment 110 that is sufficient to allow performance of one or more benchmarking tests on that representation in the secure assessment environment 114 responsive to an assessment request from a given one of the tenants 104. The evidence collection performed by evidence collection module 112 can be configured at least in part based on requirements associated with one or more tenant requests. Additionally or alternatively, the evidence collection may be performed at least in part independently of any specific tenant requests.

It should be noted that the term "compliance evidence" as used herein is intended to be broadly construed, so as to encompass, for example, any information utilizable by or on behalf of one or more tenants to assess one or more aspects of a shared computing environment in a secure manner. Accordingly, numerous types of compliance evidence other than those specifically described herein may be used in embodiments of the invention, including information relating to governance, risk and other compliance-related issues.

The tenant assessment interface 118 receives assessment requests from the tenants 104 and provides in response to a given such assessment request a corresponding assessment result that is determined by performing at least one assessment operation utilizing at least a portion of the collected evidence data 116. The assessment operations performed in the secure assessment environment may comprise, for example, particular benchmarking tests specified at least in part by the requesting tenant. Such benchmarking tests or other types of assessment operations may be specified at least in part utilizing an assessment language such as OVAL or a configuration checklist language such as XCCDF.

By isolating the separate secure assessment environment 114 from the shared computing environment 110 and providing the tenant assessment interface 118 to the secure assessment environment, the system 100 is configured such that the tenants 104 can verify that the shared computing environment 110 complies with one or more advertised security policies of the system without the need for unduly broad access privileges to the shared computing environment itself. This allows the establishment of a known level of trust in the service provider infrastructure 102, while maintaining appropriate security protections for the tenants as well as the service provider.

The air gap 115 as illustrated in the FIG. 1 embodiment is controlled at least in part by a policy manager 120. The policy manager implements selected policies for controlling various characteristics of the air gap, under control of the service provider, possibly with input from one or more of the tenants 104.

The cloud infrastructure 102 or portions thereof may be implemented using one or more processing devices of a processing platform. Examples of processing platforms that may form portions of the cloud infrastructure 102 in system 100 will be described in more detail below in conjunction with FIGS. 3 and 4.

The tenant devices 104 may also be implemented as respective processing devices. A given such processing device may comprise, for example, a computer, a mobile telephone or other type of communication device.

A given cloud infrastructure or tenant processing device generally comprises at least one processor and an associated memory, and includes one or more functional modules for controlling certain features of the system 100.

The processor in a processing device of this type may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. This memory and other memories disclosed herein may be viewed as examples of what are more generally referred to as "computer program products" storing executable computer program code.

In addition to a processor and a memory, a processing device will generally include a variety of other types of circuitry, such as network interface circuitry that allows the processing device to communicate with other processing devices over one or more networks. Such networks may include, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The network interface circuitry may comprise one or more conventional transceivers.

It is to be appreciated that the particular set of elements shown in FIG. 1 for providing secure tenant assessment of the cloud computing environment 110 of cloud infrastructure 102 is presented by way of example, and in other embodiments additional or alternative elements may be used. Thus, another embodiment may include additional sets of tenant devices or other types and configurations of information technology infrastructure and associated evidence collection and secure assessment components.

One possible implementation of the system 100 in which the cloud infrastructure comprises one or more VCE Vblocks will be described in greater detail below in conjunction with FIG. 5. Another exemplary implementation involving cloud infrastructure is described in conjunction with FIG. 6.

However, as indicated above, the disclosed techniques are not limited to use with cloud infrastructure, and can be more generally adapted for application to other types of information technology infrastructure.

As mentioned previously, various elements of system 100 such as computers, servers, storage devices or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, servers, storage devices or other types of processing devices.

It was described above that the system 100 in the present embodiment implements a process for secure tenant assessment of the cloud infrastructure 102. An example of such a process performed utilizing particular evidence collection and secure assessment components of system 100 will be described in conjunction with FIG. 2, but it is to be appreciated that numerous other types of processes may be performed in other embodiments.

Figure 2:
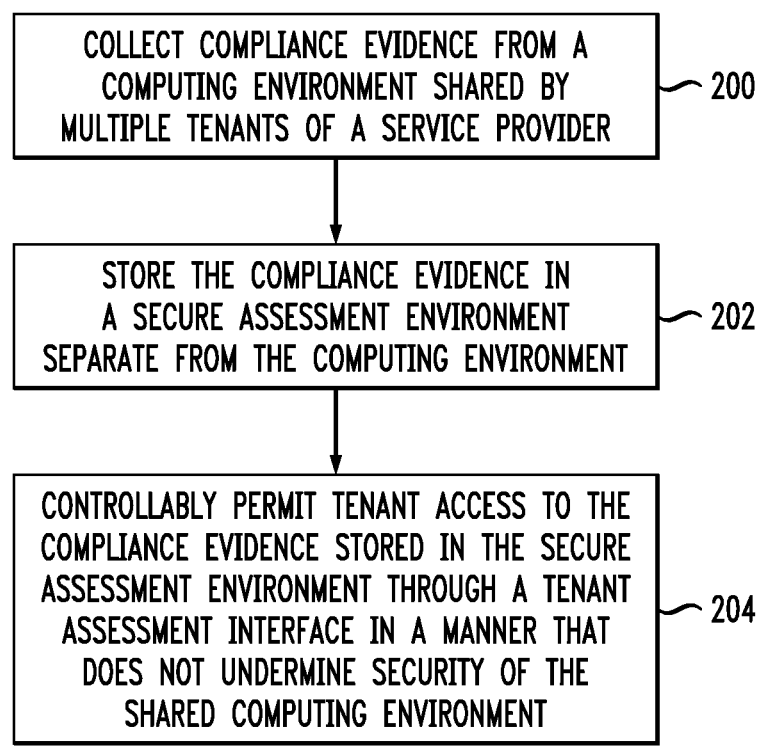
FIG. 2 is a flow diagram of a process for secure tenant assessment of a shared computing environment in the system of FIG. 1.

FIG. 2 shows a set of operations performed by the cloud infrastructure 102. The process as shown includes steps 200, 202 and 204, which are assumed to be performed using elements of the cloud infrastructure 102 such as evidence collection module 112 and secure assessment environment 114, although in other embodiments one or more such steps may be implemented at least in part by other system elements.

In step 200, compliance evidence is collected from a computing environment shared by multiple tenants of a service provider. In the present embodiment, the compliance evidence is collected from cloud computing environment 110 shared by tenants 104. The evidence collection process may be driven at least in part by expected tenant assessment requests. For example, the evidence collection may be configured to gather evidence that would be needed to satisfy one or more anticipated test suites that are expected to be part of typical assessment requests. Other factors that can be taken into account in the evidence collection process include, for example, key performance indicators to be utilized for assessment, and the different types of correlations possible.

Accordingly, the evidence collection in step 200 may be proactive or reactive evidence collection, or a hybrid of both proactive and reactive collection. It is important, however, that the evidence collected from different sources represents a consistent view of the shared computing environment. Assessment results may be inaccurate if the evidence collection steps are not correctly coordinated.

In step 202, the compliance evidence collected from the shared computing environment is stored in a secure assessment environment separate from the computing environment. More particularly, in the present embodiment, the collected compliance evidence is stored in module 116 of the secure assessment environment 114. This step generally involves storing information that is sufficient to allow one or more of the tenants 104 to each independently verify that the shared computing environment is configured in accordance with a specified security policy of the service provider. As noted above, the secure assessment environment 114 is separated from the shared computing environment 110 by the air gap 115 so as to prevent unauthorized communications between the secure assessment environment and the shared computing environment.

In step 204, one or more of the tenants 104 are controllably permitted access to the compliance evidence stored in the secure assessment environment 114 through the tenant assessment interface 118 in a manner that does not undermine security of the shared computing environment 110. This part of the process may involve, for example, receiving assessment requests from the tenants, and providing in response to a given such assessment request a corresponding assessment result that is determined by performing assessment operations utilizing at least a portion of the stored compliance evidence. As noted above, these assessment operations may include, for example, benchmarking tests specified at least in part by the requesting tenant.

The particular processing operations and other system functionality described in conjunction with the flow diagram of FIG. 2 are presented by way of illustrative example only, and should not be construed as limiting the scope of the invention in any way. Alternative embodiments can use other types of processing operations for secure tenant assessment of information technology infrastructure. For example, the ordering of the process steps may be varied in other embodiments, or certain steps may be performed concurrently with one another rather than serially. Also, one or more of the process steps may be repeated periodically or on an as-needed basis responsive to tenant requests. The steps of the FIG. 2 process are assumed to be implemented in a processing platform comprising at least one processing device having a processor coupled to a memory.

It is to be appreciated that secure tenant assessment functionality such as that described in conjunction with the flow diagram of FIG. 2 can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

The embodiments described in conjunction with FIGS. 1 and 2 can provide a number of significant advantages relative to conventional practice. For example, these embodiments allow a given tenant 104 to remotely and indirectly verify that the cloud computing environment 110 has been configured securely, i.e., that it has been appropriately "hardened" against intrusion or unauthorized usage. This may involve verifying that desired or required technical security controls and specific system configuration settings are present and operating, including but not limited to those found in a distributed computing environment, such as a cloud computing environment built on a Virtual Computing Environment (VCE) Vblock, commercially available from VCE Company, LLC.

Instead of the tenant 104 requiring direct, privileged access to detailed operating information of the cloud infrastructure 102, the security hardening assessment is performed on a set of comprehensive evidence data that has been collected from the cloud computing environment 110 by the service provider. This evidence data is gathered using the evidence collection module 112, and then communicated to the separately designated, secure assessment environment 114 where it is organized, formatted, and stored for use by the tenants 104. The evidence data can be as current and timely as necessary.

Another important advantage is that the evidence can be reconstituted for any given tenant. The system 100 can provide a set of evidence as input to any tenant assessment that is targeted to a particular tenant benchmark. A tenant with an existing set of benchmark content may therefore want the system to reconstitute the evidence in a format that it compatible with their existing content, i.e., to support the execution of existing content, such that the secure assessment environment is backward-compatible with existing benchmarks. Another tenant may not have such legacy benchmarks but may have some other type of particular assessment need, and therefore may want the evidence to be reconstituted in a different arrangement suitable to that need.

It should be noted in this regard that the secure assessment environment 114 can be configured to execute "hybrid" benchmarking test arrangements. In a hybrid arrangement of this type, for example, some benchmarking tests can be performed against a service state information model where that model is an abstraction of the actual services and represents higher level service level requirements of the associated computing environment (e.g., verify that the service level delivered is at the "gold" level), and other benchmarking tests can be performed against the native characteristics of the system (e.g., verify an actual switch port setting, and/or a file system settings, etc.). The latter benchmarking tests relate to actual native settings of the computing systems involved.

As indicated previously, the tenant-accessible evidence data is advantageously "air gapped" from the actual cloud computing environment 110 via the air gap 115. For example, it may be transferred through a secure communication infrastructure including network and application firewalls, and perhaps physically separated networks which will not permit any direct, two-way communication. This "air gap" separation ensures that tests and assessments that are done by the tenants, which would normally require privileged access on the host systems or networks of the cloud infrastructure 102, can be performed completely safely, with no special privileges and no security risk to the service provider or its cloud computing infrastructures. This also means that the secure assessment environment 114 for enabling the tenant assessments may be operated in a separate location, perhaps by another party. In general, one would apply all the standard security constructs that are well known to those skilled in the art, in order to protect this evidence data and its communication, including appropriate authentication, authorization and audit.

Accordingly, rather than relying only upon contractual assertions or claims by the service provider as to the actual state of the cloud infrastructure 102, the tenants may perform all their expected hardening tests, including existing benchmark suites, on the systems running in the cloud. But instead of running those tests directly on the cloud infrastructure 102, the tests are run on collected evidence data 116 that provides a representation of the cloud infrastructure 102 in the secure assessment environment 114.

This representation in the illustrative embodiments is sufficiently current and detailed so as to provide the requesting tenant with a security hardening assessment result that is a true representation of the actual state of the cloud computing environment 110. Because the assessment is run on a representation of the cloud infrastructure 102 rather than the cloud infrastructure itself, there is no security risk to the actual cloud infrastructure, the service provider, or the other tenants. Also, there is no limitation on capacity, scheduling, or coordination amongst the tenants and service provider, and any number of tenants can run a tenant-specific assessment at any time.

The tenant assessment requests may require assessments to be performed relative to different benchmarks specified by the corresponding tenants in the requests. The assessments can therefore be performed on a per-tenant basis, with the results of each benchmark being reported privately to the initiating tenant. Existing benchmark suites of the tenants may be utilized, and may be based at least in part on standardized configuration validation protocols and benchmark content, possibly utilizing the above-noted OVAL and XCCDF languages. As indicated previously, the evidence made accessible to any given tenant may be in a format reconstituted to meet the particular needs of that tenant, and can therefore take into account the benchmark content associated with that tenant.

The security hardening level can be assessed and reported with the scope of the assessment being matched to the specific infrastructure that is currently allocated to, or that will be allocated to, the associated tenant. The hardening level can be described and reported using measures-of-goodness or other metrics that are dynamically calibrated based on the properties of the evidence data that is being made available. More comprehensive or timelier evidence data can represent a higher confidence assessment report. Reports may be made of selected aspects of the cloud computing environment 110, include aspects that would be much more difficult to characterize using conventional approaches.

It is therefore apparent that the illustrative embodiments can be configured to support a broad array of new types of compliance assessment that would not otherwise be possible under conventional practice. These embodiments also provide for backward compatibility with existing tenant benchmarking tests, using techniques such as optional automatic translation or transformation of the benchmark content. This advantageously allows the same content to be used either for traditional, local or air-gapped proxy-style execution.

The air-gapped approach also allows scaling of the assessment service infrastructure separately from the primary cloud infrastructure that runs the tenant workloads. It may also allow sharing of final or intermediate cached results, avoiding the need to repeat assessment work unnecessarily.

In the event of non-compliance, the required remediation can be scheduled or automated so that the window of exposure is minimized, and impact to existing tenant workloads is managed.

It is important to note that embodiments of the invention can be configured to support an assessment by a trusted third party (TTP) on behalf of a given tenant. The collected evidence can be managed and maintained by a site or provider that is independent of both the tenants and their primary cloud infrastructure service provider. Such an arrangement enables a many-to-many relationship, such that a TTP assessment service provider dedicated to performing independent assessments can maintain collected evidence across many different cloud infrastructure service providers. In addition, it would be possible for the TTP assessment service provider to support assessments from many tenants, potentially off-loading this work from the cloud infrastructure service provider.

The TTP assessment service provider may also allow the tenants to securely share data that the tenants would not share with their primary cloud infrastructure service provider, thereby enabling those tenants to perform tests and correlations that would not be possible when operating only with the primary cloud infrastructure service provider. An example of this would be any validation that requires a correlation with another enterprise information technology system in order to determine compliance. If there is a need to verify a policy related to authorization in the cloud computing environment 110 by a tenant-appointed administrator, then verifying that tenant administrator's access rights may require correlation with the tenant's human resources records. This type of assessment is made possible with an independent assessor such as the TTP assessment service provider.

Figure 3:
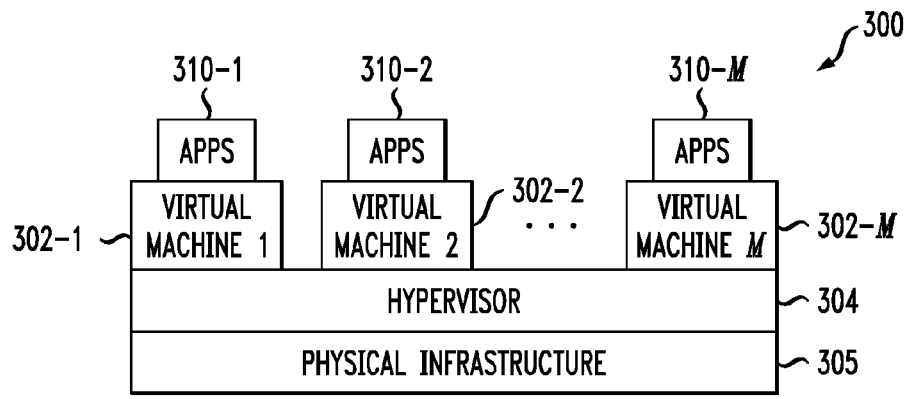
FIGS. 3 and 4 show examples of processing platforms that may be utilized to implement at least a portion of the FIG. 1 system.

Referring now to FIG. 3, portions of the information processing system 100 in this embodiment comprise cloud infrastructure 300. The cloud infrastructure 300 comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304. The cloud infrastructure 300 may be viewed as providing an example of what is more generally referred to herein as "virtual infrastructure." The cloud infrastructure 300 may encompass the entire system 100 or only portions of that system, such as the infrastructure 102. Thus, the tenant devices 104 may be viewed as comprising one or more of the virtual machines 302.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of the cloud infrastructure 102 of information processing system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the cloud infrastructure of system 100.

As indicated previously, the system 100 may be implemented using one or more processing platforms. One or more of the processing modules or other components of system 100 may therefore each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of the system 100 and includes a plurality of processing devices, denoted 402-1, 402-2, 402-3, . . . 402-K, which communicate with one another over a network 404. The network 404 may comprise any type of network, such as a WAN, a LAN, a satellite network, a telephone or cable network, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "computer program product" having executable computer program code embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

Figure 4:
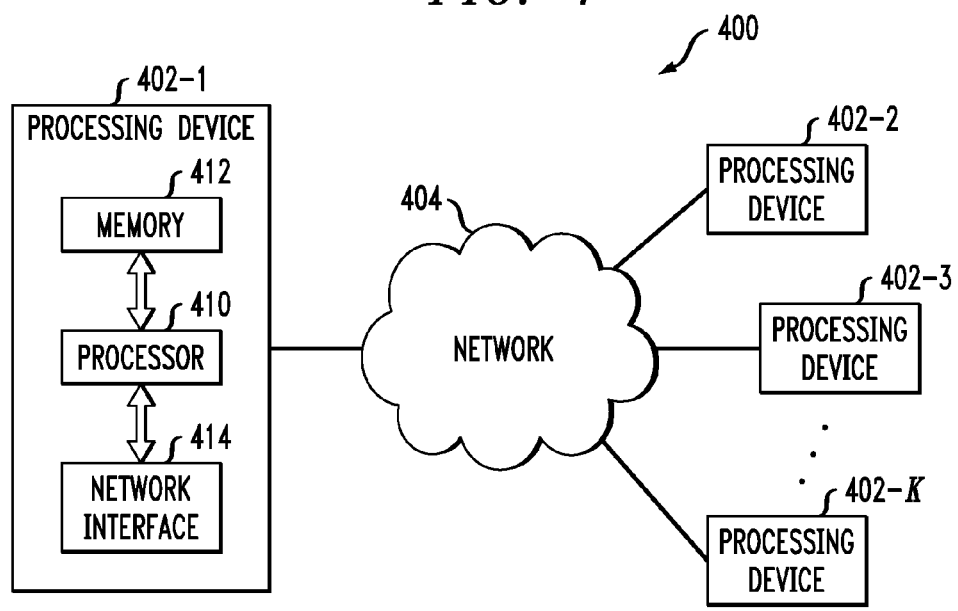

Multiple elements of information processing system 100 may be collectively implemented on a common processing platform of the type shown in FIG. 3 or 4, or each such element may be implemented on a separate processing platform.

As mentioned previously, a wide variety of different implementations of the information processing system 100 are possible. One such implementation in which the cloud infrastructure 102 comprises one or more VCE Vblocks will now be described in greater detail with reference to FIG. 5.

Figure 5:
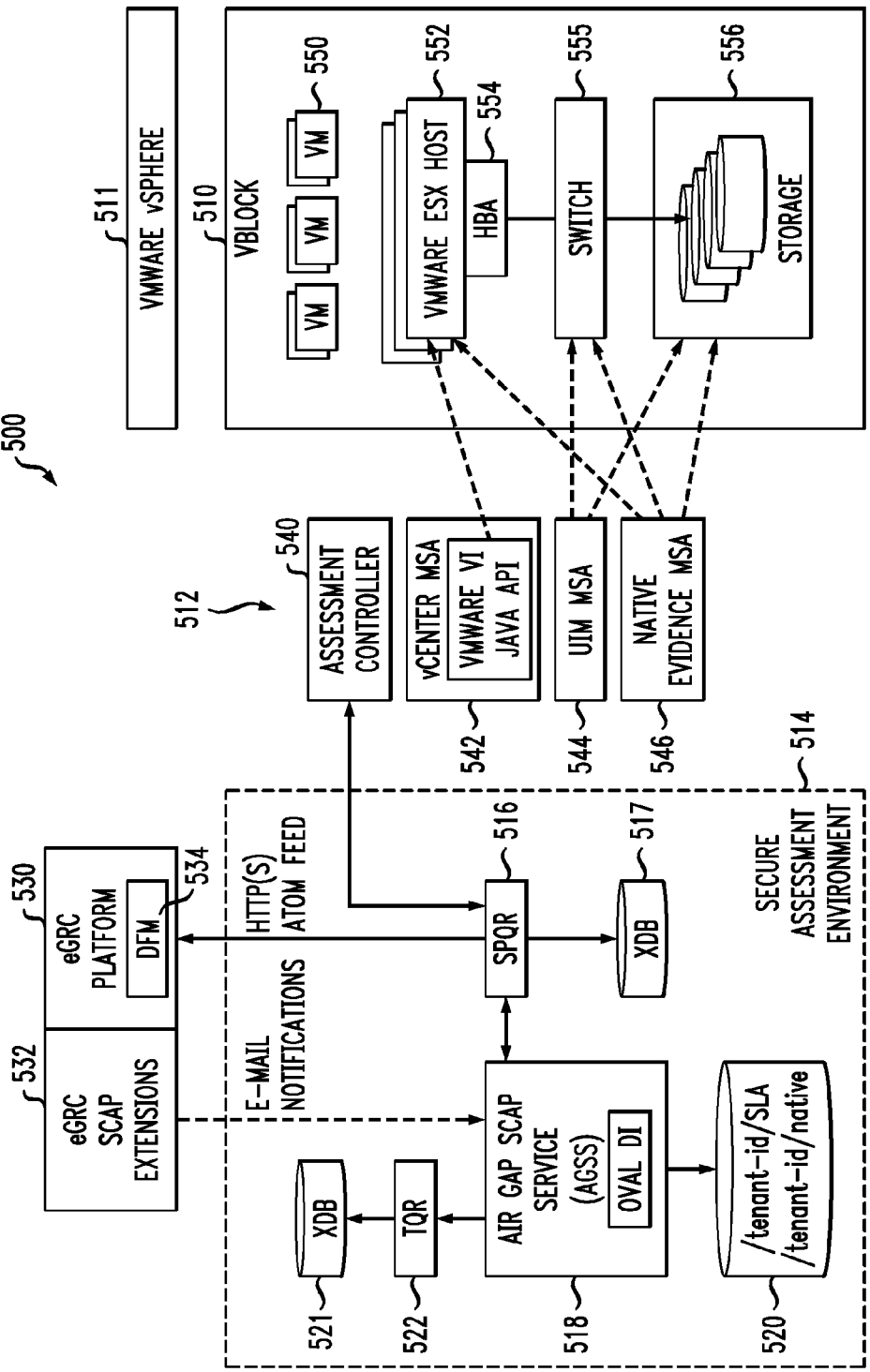

The information processing system 500 as shown in FIG. 5 comprises at least one Vblock 510 built on a VMware® VSphere™ processing platform 511. An evidence collection system 512 interfaces with the Vblock 510 and with a secure assessment environment 514. The secure assessment environment 514 in this embodiment comprises a Service Provider Quality of service Registry (SPQR) module 516 having an associated extensible database (XDB) 517, and an AGSS module 518 having an associated database 520 storing information such as service level agreement (SLA) information and native information for multiple tenant identifiers ("tenant-id"). Also associated with the AGSS module 518 is an XDB 521 coupled to module 518 via a Tenant QOS Repository (TQR) 522. AGSS in this embodiment denotes an Air Gap SCAP Service, where SCAP denotes Security Content Automation Protocol. The AGSS module 518 as shown comprises an OVAL definition interpreter (DI).

The SPQR and AGSS modules 516 and 518 may be viewed as corresponding generally to the modules 116 and 118 of secure assessment environment 114 in the FIG. 1 embodiment, but the SPQR and AGSS modules 516 and 518 provide additional or alternative functionality as will be described below. For example, the SPQR and AGSS modules in the present embodiment, in addition to storing collected evidence data and providing a tenant assessment interface, respectively, also implement business logic and other functions.

In the present embodiment, the SPQR module 516 serves as an evidence repository, and may comprise, for example, a QOS registry. It handles the compliance evidence as well as additional data needed by the service provider to operate the system, including control definitions, evidence sources, policies, service provider benchmark content, and assessment requests and responses.

The SPQR interfaces with an enterprise governance, risk and compliance (eGRC) platform 530 having associated eGRC SCAP extensions 532 for sending email notifications or other types of messages to the AGSS module 518. The eGRC platform 530 may comprise, for example, an Archer eGRC system commercially available from RSA, the Security Division of EMC Corporation. The interface between SPQR 516 and eGRC platform 530 is via a data feed manager (DFM) interface 534, although other types of data collection manager interfaces could be used in other embodiments.

The evidence collection system 512 comprises an assessment controller 540 and a plurality of evidence sources 542, 544 and 546, which illustrative comprise respective Model Supplier Adaptors (MSAs). The assessment controller 540 is responsible for interfacing between the individual evidence sources and the evidence repository provided by SPQR module 516. The AGSS module 518 uses the various types of data stored in the SPQR module 516 to determine how to satisfy a given tenant request. This may involve, for example, determining what service state information model is associated with a given tenant, what controls are associated with that service state information model, and what evidence sources are sufficient for an identified control. It may also involve utilizing information on the tenant provisioning and workload deployments.

The assessment controller 540 has the function of managing the invocations of the individual MSAs 542, 544, 546, which in this embodiment include a VCenter™ MSA, a Unified Infrastructure Manager (UIM) MSA and a native evidence MSA, respectively. Each of these MSAs operates at a different layer of the software stack, which may be configured as illustrated in FIG. 3. The native evidence MSA 546 is the lowest layer, and gathers evidence from the hardware, from the device drivers, etc. The vCenter™ MSA 542 is a virtualization layer MSA, and includes a VMware® virtual infrastructure (VI) Java API. It collects evidence from the hypervisor layer. The UIM MSA 544 is a provisioning operations MSA, and collects evidence from one or more management tools, where UIM an example of a management tool. Other types of MSAs that may be present in a given embodiment include a guest VM MSA that would collect evidence from a tenant guest OS, or other runtime environment if needed. There is generally an evidence collection MSA for each layer in the software stack, although other arrangement can be used.

The connections shown between the MSAs and components of Vblock 510 are exemplary only, and additional or alternative connections may be used in other embodiments. One or more of the MSAs may each be configured to collect evidence from more than one source. At least a subset of the MSAs referred to herein may be implemented, by way of example, as EMC Data Access APIs (DAAs). A variety of other types of APIs or adaptors may be used.

In the FIG. 5 embodiment, the SPQR module 516 not only serves as the evidence repository, but is also responsible for maintaining the relationship between the known evidence sources, the identified controls, and the defined service state information model. This is manageable through an interface that is accessible to the service provider and potentially the tenants.

The Vblock 510 in the present embodiment implements a plurality of VMs 550 using multiple VMware® ESX hosts 552 associated with respective host bus adaptor (HBA), switch and storage elements 554, 555 and 556. The evidence sources 542, 544 and 546 each interface with one or more of the elements 554, 555 and 556. In other embodiments, the HBA 554 may be replaced with a converged network adaptor (CNA).

The system 500 is also configured to conveniently and dynamically add evidence sources. These may include, for example, individual evidence sources, such as identified management APIs, file system artifacts, etc. The system is configured to trigger collection from each of its evidence sources, and to maintain the relationships between the sources. Such operations may be performed by the SPQR module 516 and assessment controller 540 at run time.

The FIG. 5 embodiment is configured to allow a given tenant 104 to request arbitrary temporal correlations. Such temporal correlations may be useful in allowing the system 500 to support conventional security hardening assessments, albeit now with an air gap. The SPQR module 516 uses its associated database 517 to store evidence gathered from different sources at different points in time, from each part of the Vblock 510 being assessed. That evidence enables the tenants and the service provider to define assessment criteria that evaluate changes in the configuration with respect to time. For example, the assessment evidence collected at each point in time can be retained and compared to earlier or later evidence, which is not possible in conventional on-host assessment. This is an important feature because it is expected that in typical implementations the Vblock 510 will be modified over time. The present embodiment addresses this issue by allowing an assessment of Vblock 510 as it was configured in one or more previous epochs.

Also, a tenant can assess criteria such as the time period that has elapsed between a prior failed assessment and the completion of an associated remediation. Assume by way of example that a certain software patch level is required. That test may fail on a given run, but may succeed on a later run. The time gap between the failure and the success may be the subject of an assessment criteria and part of the service level agreement.

When a request for assessment is received, the service provider may review the request and determine the scope of the assessment for that tenant, as well as retrieve a copy of the benchmark to be executed and prepare the assessment environment. This preparation may include retrieving and organizing the evidence in a tenant-specific runtime environment, using a correlation between the controls the tenant is able to assess and the evidence sources available for those controls. Such relationships are managed both at administration time and at runtime. The evidence sources utilized by the SPQR module 516 can also be managed with regard to characteristics such as their fidelity, timeliness, relevance, confidence and applicability to the associated controls.

Another possible implementation of the FIG. 1 system is illustrated by information processing system 600 shown in FIG. 6. This embodiment generally operates in a manner similar to system 500 as previously described in conjunction with FIG. 5. The system 600 comprises a cloud computing environment 610 coupled to an evidence collection module 612. A secure assessment environment 614 includes a QOS repository 616 having an associated QOS database 617, and an Air Gap Benchmark Service (AGBS) module 618 having associated tenant working storage 620. The QOS repository 616 and AGBS module 618 may be viewed as being analogous to SPQR module 516 and AGSS module 518, respectively, in system 500 of FIG. 5.

The AGBS module 618 also interacts with a tenant content database 621 via a tenant content service module 622, and with an eGRC platform 630 via eGRC extensions 632. The AGBS module 618 receives assessment notifications via the eGRC extensions 632 of the eGRC platform 630. The QOS repository 616 provides assessment results to a collector interface 634 of the eGRC platform 630.

An assessment controller is coupled to the QOS repository 616 and the evidence collection module 612, and operates in a manner similar to assessment controller 540 of system 500 in FIG. 5. The evidence collection module 612 in the present embodiment includes evidence sources in the form of MSAs 642, including guest, management, hypervisor, hardware, compute resource, network resource and storage resource MSAs, as well as other types of MSAs as indicated.

The secure assessment environment 614 is controlled in the present embodiment by a service assessment environment manager 660 which includes a policy manager 670. The policy manager 670 may be viewed as analogous to the policy manager 120 of system 100 in FIG. 1, and performs similar functions.

It should be noted that the connections shown in FIG. 6 between particular internal elements of the secure assessment environment 614 and external elements 622, 632, 634, 640 and 660 are exemplary only. In other embodiments, alternative connections may be used. For example, one or more of the connections to or from internal elements of the secure assessment environment 614 may originate from or terminate at a boundary of the secure assessment environment generally, rather than originate from or terminate at the particular corresponding internal element.

It should again be emphasized that the above-described embodiments of the invention are presented for purposes of illustration only. Many variations and other alternative embodiments may be used. For example, the techniques are applicable to a wide variety of other types of devices and systems that can benefit from secure tenant assessment of information technology infrastructure. Also, the particular configuration of system and device elements shown in FIGS. 1 and 3-6, and the secure tenant assessment process shown in FIG. 2, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   information technology infrastructure comprising:
   a computing environment shared by multiple tenants of a service provider;
   a secure assessment environment separate from the computing environment;
   an evidence collection module associated with the shared computing environment and configured to collect compliance evidence from the shared computing environment and to make the collected compliance evidence available to the secure assessment environment for storage therein; and a tenant assessment interface to the secure assessment environment configured to receive assessment requests from the multiple tenants and through which the multiple tenants can access the compliance evidence as stored in the secure assessment environment in a manner that does not undermine security of the shared computing environment;

wherein the compliance evidence comprises information sufficient to allow a given one of the tenants to verify that the shared computing environment is configured in accordance with a specified security policy; and wherein the evidence collection module is further configured to collect the compliance evidence based at least in part on expected tenant assessment requests.

2. The apparatus of claim 1 wherein the information technology infrastructure comprises cloud infrastructure of a cloud service provider and the shared computing environment comprises a cloud computing environment.

3. The apparatus of claim 1 wherein the evidence collection module is implemented at least in part within at least one of the shared computing environment and the secure assessment environment.

4. The apparatus of claim 1 wherein the evidence collection module is configured to collect compliance evidence at least in part based on requirements associated with one or more benchmarking tests specified by requesting tenants.

5. The apparatus of claim 1 wherein the compliance evidence is arranged in a format that is backward-compatible with one or more legacy benchmarking tests of at least one of the tenants.

6. The apparatus of claim 1 wherein the compliance evidence is arranged in a format that supports hybrid benchmarking arrangements comprising one or more tests performed against a service state information model that represents an abstraction of the shared computing environment and one or more tests performed against native settings of the shared computing environment.

7. The apparatus of claim 1 wherein the tenant assessment interface provides no tenant access to the shared computing environment.

8. The apparatus of claim 1 wherein the specified security policy comprises a specified security policy of the service provider.

9. The apparatus of claim 1 wherein the tenant assessment interface is configured to provide in response to a given assessment request a corresponding assessment result that is determined by performing at least one assessment operation utilizing at least a portion of the stored compliance evidence.

10. The apparatus of claim 9 wherein the assessment operation comprises a benchmarking test specified at least in part by the requesting tenant.

11. The apparatus of claim 9 wherein the assessment operation is specified at least in part in at least one of an OVAL language and an XCCDF language.

12. The apparatus of claim 1 wherein at least a portion of the collected compliance evidence is stored in the secure assessment environment in association with provenance metadata identifying a source of the portion of the collected compliance evidence.

13. The apparatus of claim 12 wherein the portion of the collected compliance evidence is stored in the secure assessment environment in an encapsulated form utilizing an XML envelope that incorporates the provenance metadata.

14. The apparatus of claim 1 wherein the compliance evidence provides a representation of the shared computing environment sufficient to allow performance of one or more benchmarking tests on that representation in the secure assessment environment.

15. The apparatus of claim 1 wherein the tenant assessment interface is configured to permit access by a trusted third party assessment service provider associated with the tenant in place of the tenant itself.

16. The apparatus of claim 1 further comprising a management module associated with the service provider and utilized by the service provider to manage at least a portion of the secure assessment environment.

17. An apparatus comprising:
information technology infrastructure comprising:
a computing environment shared by multiple tenants of a service provider;
a secure assessment environment separate from the computing environment;
an evidence collection module associated with the shared computing environment and configured to collect compliance evidence from the shared computing environment and to make the collected compliance evidence available to the secure assessment environment for storage therein; and
a tenant assessment interface to the secure assessment environment configured to receive assessment requests from the multiple tenants and through which the multiple tenants can access the compliance evidence as stored in the secure assessment environment in a manner that does not undermine security of the shared computing environment;
wherein the compliance evidence comprises information sufficient to allow a given one of the tenants to verify that the shared computing environment is configured in accordance with a specified security policy; and
wherein the secure assessment environment is configured to maintain relationships between controls assessable by the tenants, sources of evidence relating to those controls, and corresponding service state information models.

18. The apparatus of claim 17 wherein the secure assessment environment is configured to adapt one or more of the relationships at run time in response to one or more tenant assessment requests.

19. An apparatus comprising:
information technology infrastructure comprising:
a computing environment shared by multiple tenants of a service provider;
a secure assessment environment separate from the computing environment;
an evidence collection module associated with the shared computing environment and configured to collect compliance evidence from the shared computing environment and to make the collected compliance evidence available to the secure assessment environment for storage therein; and
a tenant assessment interface to the secure assessment environment configured to receive assessment requests from the multiple tenants and through which the multiple tenants can access the compliance evidence as stored in the secure assessment environment in a manner that does not undermine security of the shared computing environment;
wherein the compliance evidence comprises information sufficient to allow a given one of the tenants to verify that the shared computing environment is configured in accordance with a specified security policy; and wherein the secure assessment environment is configured to provide different reconstitutions of at least a portion of the compliance evidence for different ones of the tenants so as to take into account respective different sets of benchmark content associated with those tenants.

20. A method comprising the steps of:

collecting compliance evidence from a computing environment shared by multiple tenants of a service provider;

storing the compliance evidence in a secure assessment environment separate from the computing environment;

receiving assessment requests from two or more of the multiple tenants through a tenant assessment interface; and controllably permitting tenant access to the compliance evidence stored in the secure assessment environment through the tenant assessment interface in a manner that does not undermine security of the shared computing environment;

wherein the collecting, storing and controllably permitting steps are implemented in a processing platform comprising at least one processing device having a processor coupled to a memory; and wherein the step of storing the compliance evidence comprises storing information sufficient to allow a given one of the tenants to verify that the shared computing environment is configured in accordance with a specified security policy; and wherein the step of collecting compliance evidence comprises collecting the compliance evidence based at least in part on expected tenant assessment requests.

21. The method of claim 20 wherein the specified security policy comprises a specified security policy of the service provider.

22. The method of claim 20 further comprising providing in response to a given assessment request a corresponding assessment result that is determined by performing at least one assessment operation utilizing at least a portion of the stored compliance evidence.

23. The method of claim 20 further comprising maintaining relationships between controls assessable by the tenants, sources of evidence relating to those controls, and corresponding service state information models.

24. The method of claim 20 wherein the step of controllably permitting tenant access to the compliance evidence stored in the secure assessment environment comprises providing different reconstitutions of at least a portion of the compliance evidence for different ones of the tenants so as to take into account respective different sets of benchmark content associated with those tenants.

25. A computer program product comprising a non-transitory processor-readable storage medium having encoded therein executable code of one or more software programs, wherein the one or more software programs when executed by the processing platform cause the processing platform to perform the steps of:

collecting compliance evidence from a computing environment shared by multiple tenants of a service provider;

storing the compliance evidence in a secure assessment environment separate from the computing environment;

receiving assessment requests from two or more of the multiple tenants through a tenant assessment interface; and controllably permitting tenant access to the compliance evidence stored in the secure assessment environment through the tenant assessment interface in a manner that does not undermine security of the shared computing environment;

wherein the step of storing the compliance evidence comprises storing information sufficient to allow a given one of the tenants to verify that the shared computing environment is configured in accordance with a specified security policy; and wherein the step of collecting compliance evidence comprises collecting the compliance evidence based at least in part on expected tenant assessment requests.

26. The computer program product of claim 25 wherein the one or more software programs when executed by the processing platform further cause the processing platform to perform the step of maintaining relationships between controls assessable by the tenants, sources of evidence relating to those controls, and corresponding service state information models.

27. The computer program product of claim 25 wherein the step of controllably permitting tenant access to the compliance evidence stored in the secure assessment environment comprises providing different reconstitutions of at least a portion of the compliance evidence for different ones of the tenants so as to take into account respective different sets of benchmark content associated with those tenants.

28. An apparatus comprising:

a processing platform comprising at least one processing device having a processor coupled to a memory;

wherein said at least one processing device is configured to collect compliance evidence from a computing environment shared by multiple tenants of a service provider, to store the compliance evidence in a secure assessment environment separate from the computing environment, and to receive assessment requests from the multiple tenants through a tenant assessment interface; and wherein the tenants are controllably permitted access to the compliance evidence stored in the secure assessment environment through the tenant assessment interface in a manner that does not undermine security of the shared computing environment; and wherein the compliance evidence comprises information sufficient to allow a given one of the tenants to verify that the shared computing environment is configured in accordance with a specified security policy; and wherein said at least one processing device is configured to collect the compliance evidence based at least in part on expected tenant assessment requests.

29. The apparatus of claim 28 wherein the apparatus is implemented in a cloud-based information processing system.

30. The apparatus of claim 28 wherein said at least one processing device is further configured to maintain relationships between controls assessable by the tenants, sources of evidence relating to those controls, and corresponding service state information models.

31. The apparatus of claim 28 wherein said at least one processing device is further configured to provide different reconstitutions of at least a portion of the compliance evidence for different ones of the tenants so as to take into account respective different sets of benchmark content associated with those tenants.

* * * * *